(12) United States Patent
Beck

(10) Patent No.: US 8,247,923 B2
(45) Date of Patent: Aug. 21, 2012

(54) METHOD FOR OPERATING A PHOTOVOLTAIC SYSTEM AND PHOTOVOLTAIC SYSTEM FOR CARRYING OUT THE METHOD

(75) Inventor: Bernhard Beck, Volkach OT Dimbach (DE)

(73) Assignee: Adensis GmbH, Kolitzheim (DE)

( * ) Notice: Subject to any disclaimer, the term of this patent is extended or adjusted under 35 U.S.C. 154(b) by 296 days.

(21) Appl. No.: 12/649,536

(22) Filed: Dec. 30, 2009

(65) Prior Publication Data

US 2010/0164302 A1 Jul. 1, 2010

(30) Foreign Application Priority Data

Sep. 10, 2008 (DE) .......................... 10 2008 046 606

(51) Int. Cl.
*H02J 3/14* (2006.01)
(52) U.S. Cl. .......... 307/29; 318/139; 318/140; 318/434; 318/480; 318/609
(58) Field of Classification Search .................. 307/151, 307/29; 363/102; 318/480, 139, 140, 432, 318/434, 609
See application file for complete search history.

(56) References Cited

U.S. PATENT DOCUMENTS

| | | | |
|---|---|---|---|
| 7,609,019 B2 | 10/2009 | Beck et al. | |
| 2010/0090634 A1* | 4/2010 | Beck et al. | 318/480 |

FOREIGN PATENT DOCUMENTS

| | | |
|---|---|---|
| DE | 100 61 724 A1 | 3/2002 |
| DE | 103 04 610 A1 | 8/2004 |
| DE | 20 2006 002 726 | 4/2006 |
| DE | 10 2005 000 998 | 7/2006 |
| DE | 10 2007 056618 | 6/2009 |
| EP | 102005000998 A1 * | 7/2006 |
| EP | 1 863 165 A1 | 12/2007 |

* cited by examiner

*Primary Examiner* — Rexford Barnie
*Assistant Examiner* — Toan Vu
(74) *Attorney, Agent, or Firm* — Henry M. Feiereisen LLC (57) ABSTRACT

A photovoltaic system having a plurality of photovoltaic modules producing electric energy and method for operating such photovoltaic system are disclosed. With the method, the photovoltaic modules are connected to a first DC motor having a motor shaft, and a generator shaft of a three-phase generator is coupled to the motor shaft. The three-phase generator can be connected to a power grid. The motor shaft of a second DC motor can be connected to the generator shaft, with only one of the two DC motors being initially driven with the electric energy produced by the photovoltaic modules. The electric energy is subsequently divided among both the first and the second DC motor. This process significantly shortens the startup process of the photovoltaic system compared to conventional systems.

10 Claims, 4 Drawing Sheets

METHOD FOR OPERATING A PHOTOVOLTAIC SYSTEM AND PHOTOVOLTAIC SYSTEM FOR CARRYING OUT THE METHOD

BACKGROUND OF THE INVENTION

The invention relates to a method for operating a photovoltaic system with a plurality of photovoltaic modules and with a first DC motor connectable to the photovoltaic modules, with the motor axle configured for coupling to a shaft of a three-phase generator, wherein the three-phase generator can be connected to a power grid. This method is intended to feed the AC current produced in a large system by the three-phase generator into a power grid, preferably a public utility grid. The system has, in particular, a power rating of more than 1 MW, i.e., a relatively high power output.

The invention also relates to a photovoltaic system for carrying out the method.

In conventional photovoltaic systems, the total DC current supplied by the photovoltaic modules is converted by an electric inverter or converter into an AC current or a three-phase current, which is then supplied to a power grid. Currently, electric inverters based on semiconductor components are commercially offered for large-scale systems, which are designed for a power output of up to 700 kW. Several purely electric inverters must be provided in a photovoltaic system with a power output in excess of 1 MW. For example, a solar system having a power output of 2.5 MW employs at least 8 electric inverters, each having a power rating of 330 kW.

DE 100 61 724-A1 discloses providing a plurality of electronic inverters which are controlled by a relatively complex control process using a plurality of switches at an operating point which is optimized for the individual inverters.

Although an electric inverter has a high-efficiency for converting energy, it should be noted that the inverter reacts very sluggishly due to the relatively large electric capacitance of the employed capacitors. Currently, it may take 20 seconds to 3 minutes, until the associated control device adapts such inverter to changes in the actual incident solar energy.

The invention is based on the concept that a combination of a DC motor with a three-phase motor arranged between the photovoltaic modules and the power grid provides certain advantages in larger systems of 1 MW and above. DC motors and three-phase generators for such high power levels are commercially available. Such a combination has the advantage over a plurality of electric inverters that the smaller number of components makes them less susceptible to statistically occurring malfunctions. Another advantage is reduced maintenance. Advantageously, only two units need to be monitored during operation, namely the DC motor and the three-phase generator.

DE 20 2006 002 726 U1 discloses a motor-generator assembly for operating a solar system. This document, however, only addresses the mechanical construction of the motor-generator assembly. Several pole wheels, which each run on their own stator, are provided on a common shaft. This measure is intended to increase the efficiency of converting the regenerative energy, which is also intended in DE 100 61 724-A1. However, it is not an object of the present invention to increase the efficiency of the energy conversion.

It has proven to be difficult in practical applications to start up an electromechanical machine assembly, which includes a DC motor and a three-phase generator, because particularly in the morning, the required minimum energy necessary for bringing the machine assembly to a rotation speed necessary for synchronization is inadequate, or because synchronization takes a long time. An electromechanical machine assembly of, for example, 4 MW has a weight of approximately 10,000 kg and hence a correspondingly high mass to be brought up to the rotation speed. These masses must be brought to the rotation speed by the solar system, in particular during startup in the morning, to enable synchronization with the grid. In addition, a higher consumption of commutator or contact brushes in the DC motor can be expected with a slowly rotating machine assembly. This causes in the end undesirable wear.

Based on this observation, it is the object of the present invention to provide a method for a photovoltaic system having a high power output which shortens the startup phase and attains the synchronization conditions more quickly, and also reduces wear of the commutator brushes. It is also an object to provide a photovoltaic system which satisfies these conditions.

SUMMARY OF THE INVENTION

This object is solved with the method of the invention in that the motor axle of a second DC motor can be connected with the shaft, and that the electric energy produced by the photovoltaic modules is initially used for driving only one of the two DC motors, and is in the subsequent operational phase divided over both DC motors.

With this method, the entire energy available from all photovoltaic modules can be used for starting up one of the two DC motors. This shortens the startup time until the synchronization conditions are attained. In other words, the single relatively large and sluggish DC motor in conventional systems is replaced with two smaller DC motors which can be more easily adapted to the synchronization conditions.

Advantageously, only the first DC motor is initially connected with the three-phase generator, and the second DC motor is only added when the first DC motor attains its nominal power. This means that the first DC motor operates already fully adapted to the conditions of the power grid, and that half of the available electric energy generated by the photovoltaic modules can be utilized entirely for starting up the second DC motor.

The available number of modules can also be divided asymmetrically, for example 70% to 30% in favor of the second DC motor to be switched in.

In another advantageous embodiment, the first and/or the second DC motor can be connected with the shaft of the three-phase generator via a coupling. This measure provides a high degree of flexibility in the control of the system. For example, the first DC motor or the second DC motor can be selectively started up to satisfy the switch-in conditions, while the other DC motor is switched in later.

In this context, the photovoltaic modules can advantageously be divided into a first and a second subset no later than when the switchover takes place, wherein the first subset supplies its generated power to a first output and the second subset supplies its generated power to a second output. The first and the second output can then be connected by a switching element with the input of the first and the second DC motor, respectively. A bridge switch connects in a closed state the first output with the second output so that both outputs are connected in parallel.

With respect to the photovoltaic system for carrying out the method, the object is attained with the invention by a plurality of photovoltaic modules, two DC motors connectable to the photovoltaic modules and supplied, when connected, by the photovoltaic modules with a DC voltage and a DC current, and a three-phase generator having a shaft which can be connected with the first and/or the second DC motor by a corresponding coupling, wherein the three-phase generator can be connected to a power grid for supplying the generated AC voltage.

Advantageously, the photovoltaic modules can here also be subdivided into a first and a second subset, wherein the first subset provides its generated power to a first output and the second subset provides its generated power to a second output, wherein the first and second outputs can be connected by a corresponding switching element with a corresponding input of the first and the second DC motor, and wherein a bridge switch connects in a closed state the first output with the second output in parallel.

Advantageously, the first and second subset should have identical size, in particular when the two DC motors have identical nominal power ratings.

If a later expansion of the photovoltaic system should be included in the design, then DC motors with different power ratings may advantageously be provided, wherein the nominal power rating of one of the two DC motors should already take the later expansion into consideration.

For the logistics of the transport and for facilitating installation at the installation site as well as for maintaining inventory of electromechanical converters, the two DC motors, the three-phase generator, the associated control unit, the switches and the bridge switch may advantageously be pre-installed in a cargo container. The cargo container can be shipped as a single unit and moved to a prepared foundation at the installation site, so that only the power supply cable from the photovoltaic modules and the power cable to the power grid need to be connected.

The advantages of the invention will now be described with reference to an example which includes numerical values, but should not be not viewed as limiting the invention.

Starting point is a conventional photovoltaic system with a plurality of photovoltaic modules and a maximum power output of 1 MW. The plurality of the provided photovoltaic modules is matched to a DC motor having a nominal power rating of 1 MW. The DC motor drives a three-phase generator which is also rated for a nominal power output of 1 MW.

According to the invention, a second DC motor is provided in addition to a first DC motor, wherein the second DC motor can also connected to drive a three-phase generator. In this example, the plurality of the photovoltaic modules has also a maximum total power output of 1 MW. The plurality of the photovoltaic modules can here be divided into two photovoltaic blocks, each having a maximum power output of 0.5 MW. The first exemplary DC motor has a nominal power rating of only 0.5 MW. Its nominal power output is hence only half of the nominal power rating of the single DC motor considered in the conventional embodiment. The second DC motor has the same nominal power rating of 0.5 MW. The three-phase generator has here also a nominal power output of 1 MW. The present example is based on these numerical values.

According to the invention, during startup both exemplary photovoltaic blocks having each a maximum power output of 0.5 MW are initially connected in common only with the first DC motor having a nominal power rating of 0.5 MW. This condition is maintained until a switchover process takes place. The switchover when, for example, the first DC motor attains 65 to 80% of the nominal power, i.e., when the first DC motor receives a power of 0.325 to 0.40 MW. During the switchover, the photovoltaic modules are divided into two photovoltaic blocks, with the two blocks having approximately equal size. Accordingly, two blocks are generated, each having a maximum power output of 0.5 MW. After the switchover, the power output from the first block of up to 0.5 MW is applied to the first DC motor, and the power output from the second block of up to 0.5 MW is applied to the second DC motor.

It should be noted that unlike with a conventional system, only one DC motor with a nominal power rating of 0.5 MW is initially started up. This occurs significantly faster than the startup of the single conventional DC motor with a power rating of 1 MW at the same photovoltaic power. This is due to the different mass inertia moments. It should be mentioned again, that the three-phase generator is here also designed for a nominal power output of 1 MW.

The following applies: the second DC motor is started up only when the totality of the photovoltaic modules supplies relatively high power. The second DC motor, which like the first DC motor has a relatively small mass inertia moment compared to the single conventional DC motor, can now also start up relatively quickly. The startup process is hence significantly shortened compared to conventional systems. Accordingly, the known synchronization conditions (attaining the grid frequency with the three-phase generator, matching the phase angle between the three-phase generator and grid) can now be attained more quickly, which may also reduce wear on the carbon brushes in the long term. By attaining the synchronization conditions more quickly, energy can be supplied to the power grid earlier. This can have a positive impact on the financial reward obtained from selling power to the operator of the power grid.

BRIEF DESCRIPTION OF THE DRAWING

Exemplary embodiments of the invention will now be described in more detail with reference to the appended drawings. It should be noted that FIGS. 2 and 3 are directed to operation with two DC motors and FIG. 4 to a container for prefabricating the electromechanical converter as a self-contained assembly. The drawings show in.

DETAILED DESCRIPTION OF PREFERRED EMBODIMENTS

Figure 1:
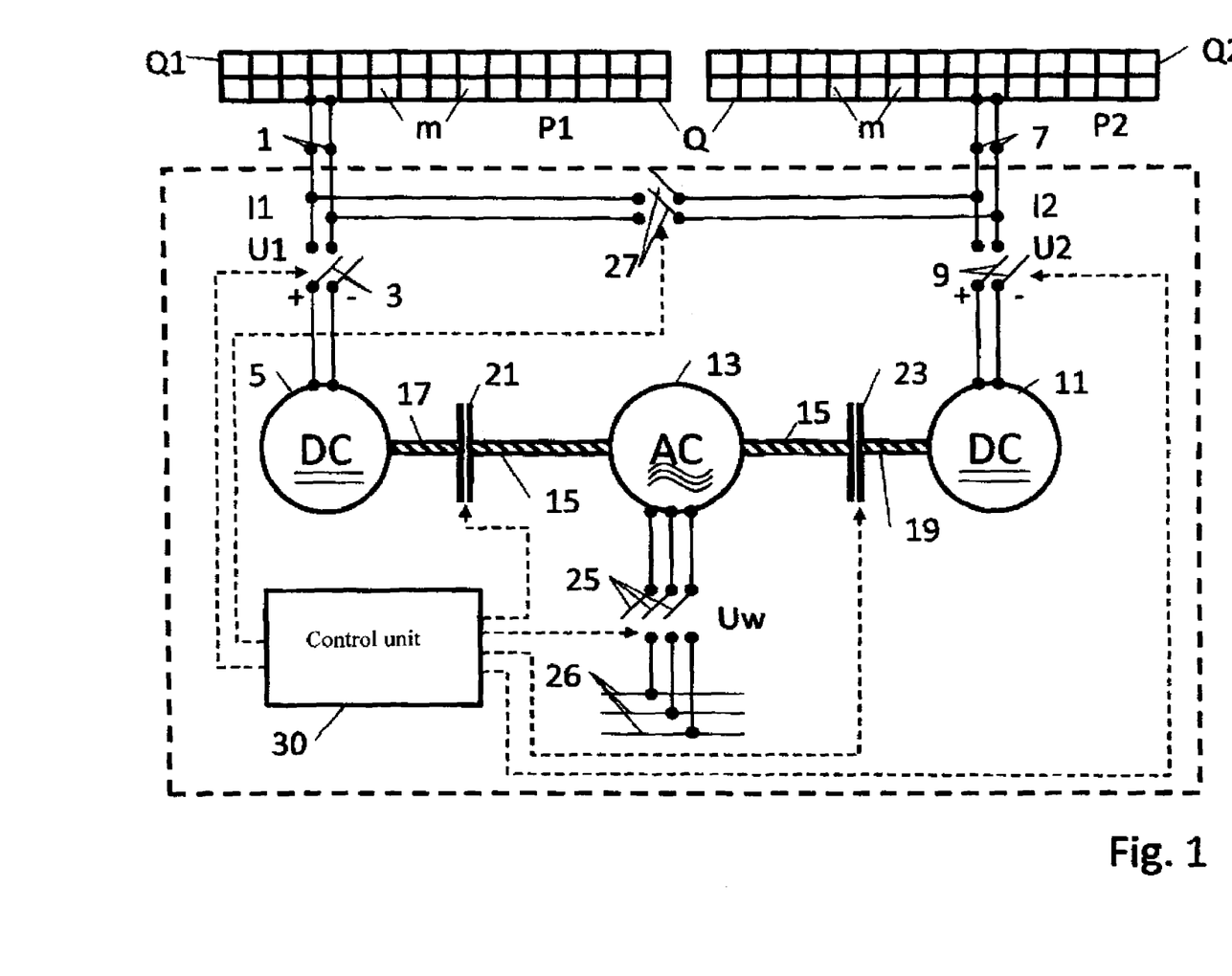
FIG. 1 a schematic diagram of a photovoltaic system with an electromechanical converter with two DC motors and a three-phase generator, FIG. 2 the switching state of the photovoltaic system of FIG. 1 in operation under partial load, FIG. 3 the switching state of the photovoltaic system of FIG. 1 in operation under full load, and FIG. 4 a container housing an electromechanical converter.

In FIG. 1, Q1 designates a first subset of photovoltaic modules m as a first energy source with a first nominal power output. This first subset Q1 has a first output with a pair 1 of output terminals supplying a first DC voltage U1 and a first DC current I1. The pair 1 of output terminals can be connected via a first switch 3 to drive a first externally excited DC motor 5. The power P1 of the first DC motor 5 can be controlled with a control unit 30 by way of its excitation current, for example according to the so-called conventional MPP control method according to EP 1 863 165 (=U.S. Pat. No. 7,609,019).

In an analogous manner, as shown on the right side of FIG. 1, a second subset Q2 of photovoltaic modules m is provided as a second energy source with a second nominal power output. The second subset Q2 has a second output with a second pair 7 of output terminals supplying a second DC voltage U2 and a second DC current I2. The pair 7 of output terminals can be connected via a second switch 9 to drive a second externally excited DC motor 11. The power P2 of the second DC motor 11 can also be controlled by the control unit 30 by way of its excitation current, for example also according to the conventional MPP control method. The two DC motors 5, 11 have the same nominal power rating, for example each 1.25 MW. However, the power rating can also be different, for example 0.8 MW or 2.0 MW, respectively.

A three-phase generator 13 is arranged between the two DC motors 5, 11, with the continuous shaft 15 aligned with the two motor shafts 17, 19 of the corresponding DC motors 5 and 11, respectively. The generator shaft 15 extends to the left and to the right from the three-phase generator 13 and is provided at each free end with a corresponding first and second coupling 21 and 23. The motor shafts 17, 19 of the DC motors 5 and 11 can be separately connected with the three-phase generator 13 by way of the couplings 21, 23. The three-phase generator 13 has an output with an electric terminal or switching element 25 for connection to a power grid 26, supplying an AC voltage $U_W$ to the power grid 26. The control unit 30 is configured for switching the switches 3, 9, or the switching element 25, as indicated by dashed lines.

The control unit 30 is also configured to operate a bridge switch 27 which connects the output terminals 1 and 7 with one another. When the bridge switch 27 is closed, the two outputs 1 and 7 are connected in parallel. During startup of the first DC motor 5, the bridge switch 27 is closed and the power from the second energy source Q2 is also applied to the input of the first DC motor 5. When the power of the first DC motor 5 reaches a predetermined value, in particular for example its nominal power, the bridge switch 27 is opened. The electric energy generated by the energy source Q2 is then used to start up and operate the second DC motor 11. When the rotation speed of the axle 19 the of the second DC motor 11 matches the rotation speed of the shaft 15, the control unit 30 provides a signal to initiate the coupling operation of coupling 23. After coupling is completed, the axles 17, 19 together with the shaft 15 form a common rotary connection.

Figure 2:
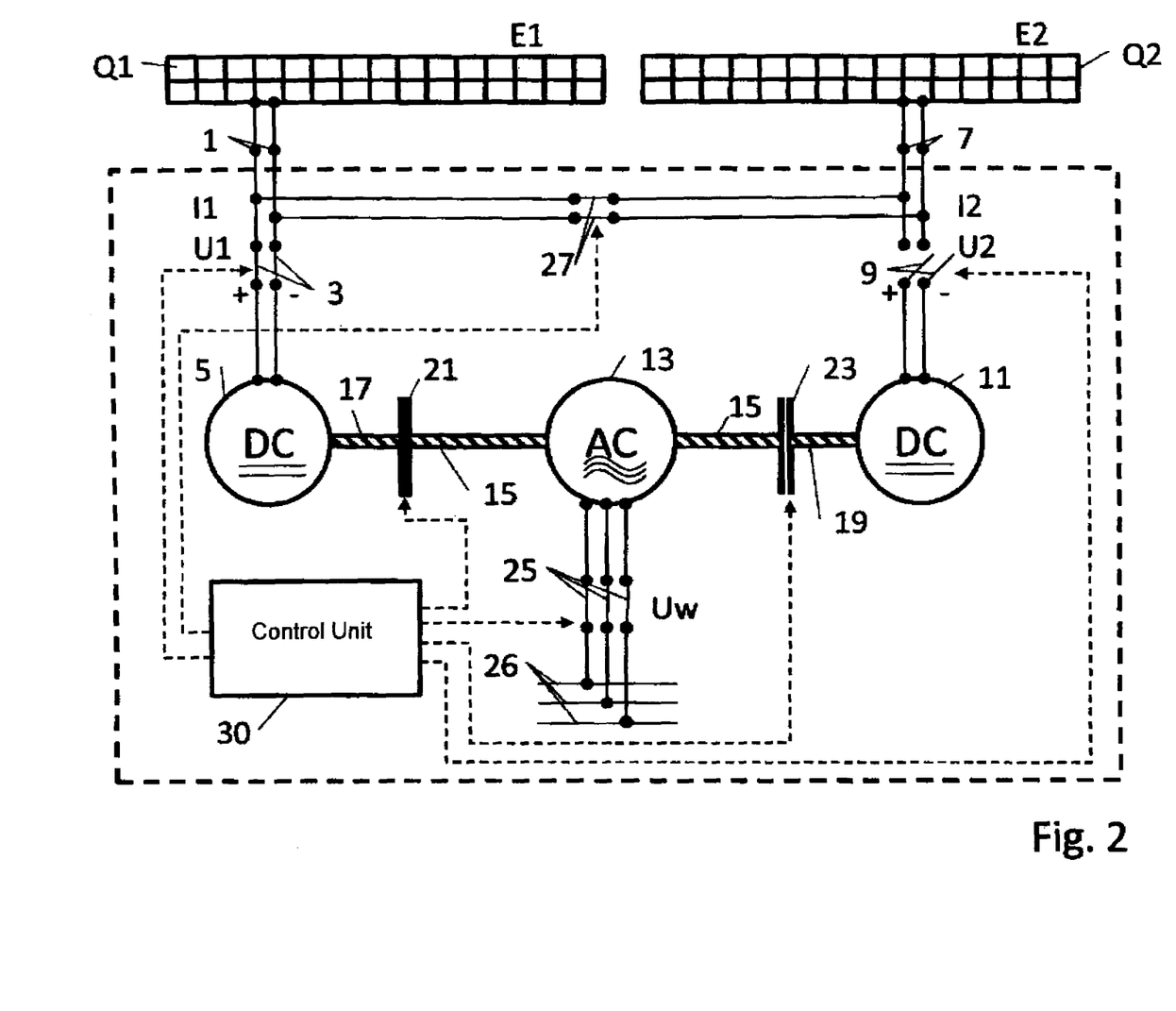

FIG. 2 illustrates operation under partial load or startup. Only the first DC motor 5 is operated. The second switch 9 is open while the bridge switch 27 is closed, so that both subsets Q1, Q2 of photovoltaic modules are connected in parallel. The power E2 from the second energy source is then available at the input of the first electric motor 5 in addition to the power E1 from the first energy source. The first coupling 21 is here closed, so that the output of the first DC motor 5 is connected via the shafts 17 and 15 with the three-phase generator 13. The two photovoltaic energy sources then operate in common on the three-phase generator 13, allowing the three-phase generator 13 to supply power to the power grid 26 after conventional synchronization and after the switch 25 is closed.

It is now monitored when the power of the first DC motor 5 reaches a predetermined value, in particular 65 to 60% of the nominal power at which the DC motor 5 is rated. This can be done with an (unillustrated) measuring device, which forms the product of the first voltage U1 and the first current I1 and compares this product with the predetermined value. The comparator can be included in the control unit 30. After the predetermined power value is attained, the unit 30 initiates a switchover operation.

Figure 3:
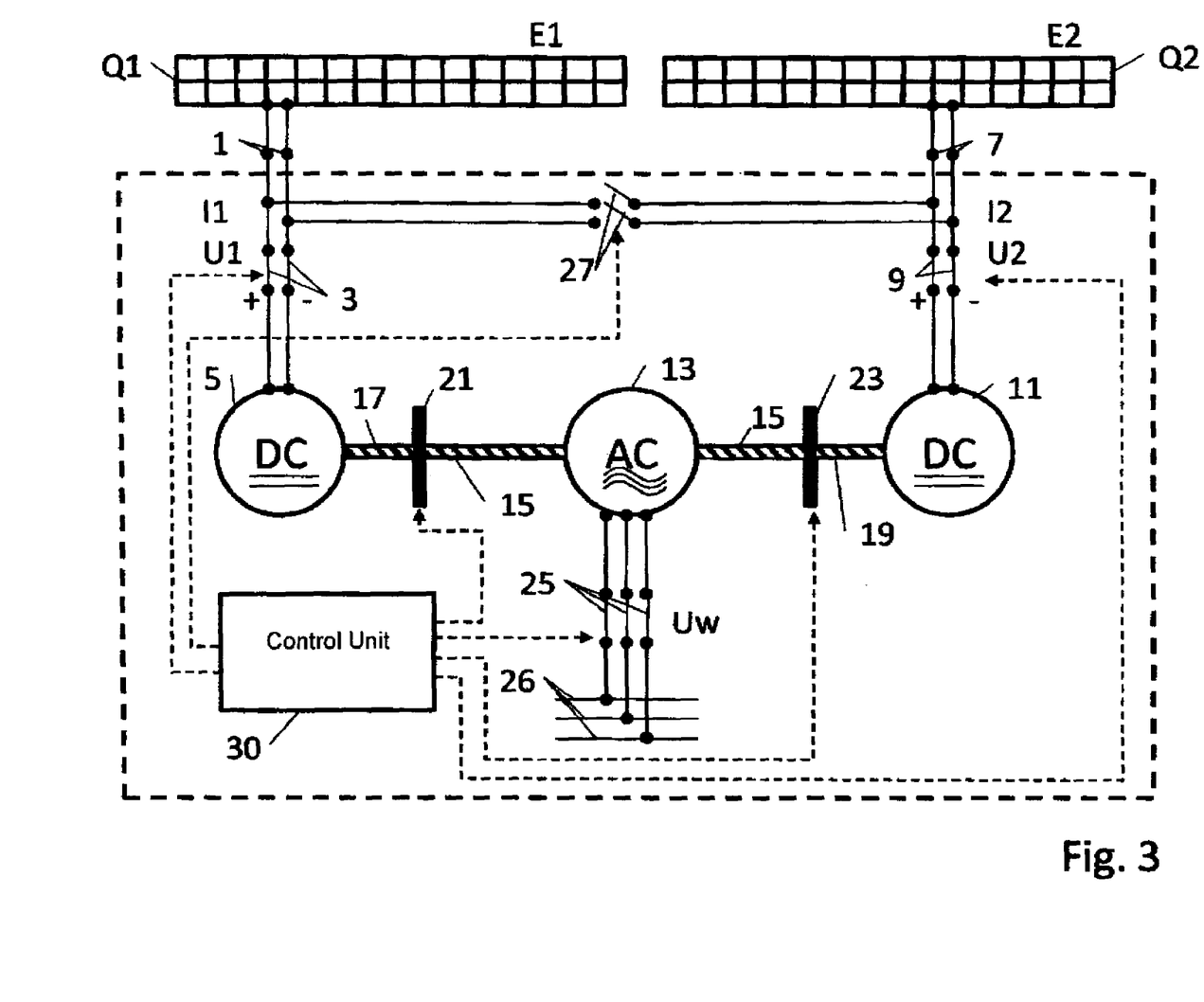

After the switchover operation, operation under full load commences, as illustrated in FIG. 3. During the switchover operation, the switch positions illustrated in FIG. 3 are assumed. The bridge switch 27 is now open and the switch 9 is closed. The switch 3 remains closed. The electric power E2 produced by the second subset Q2 is here used for startup and subsequent operation of only the second DC motor 11.

When the rotation speed of the motor shaft 19 matches the rotation speed of the shaft 15, the control unit 30 provides via the dashed control line a signal for initiating the coupling operation of the second coupling 23. After coupling, the motor shafts 17 and 19 together with the shaft 15 form a common rotary connection.

The system described in FIGS. 1 to 3 shortens the startup time compared to a system with a single DC motor used for driving the three-phase generator with the same power rating. Because a considerable number of startup operations are required throughout a week or even a day, the startup time saved during a single year can have considerable financial impact with large photovoltaic systems.

Figure 4:
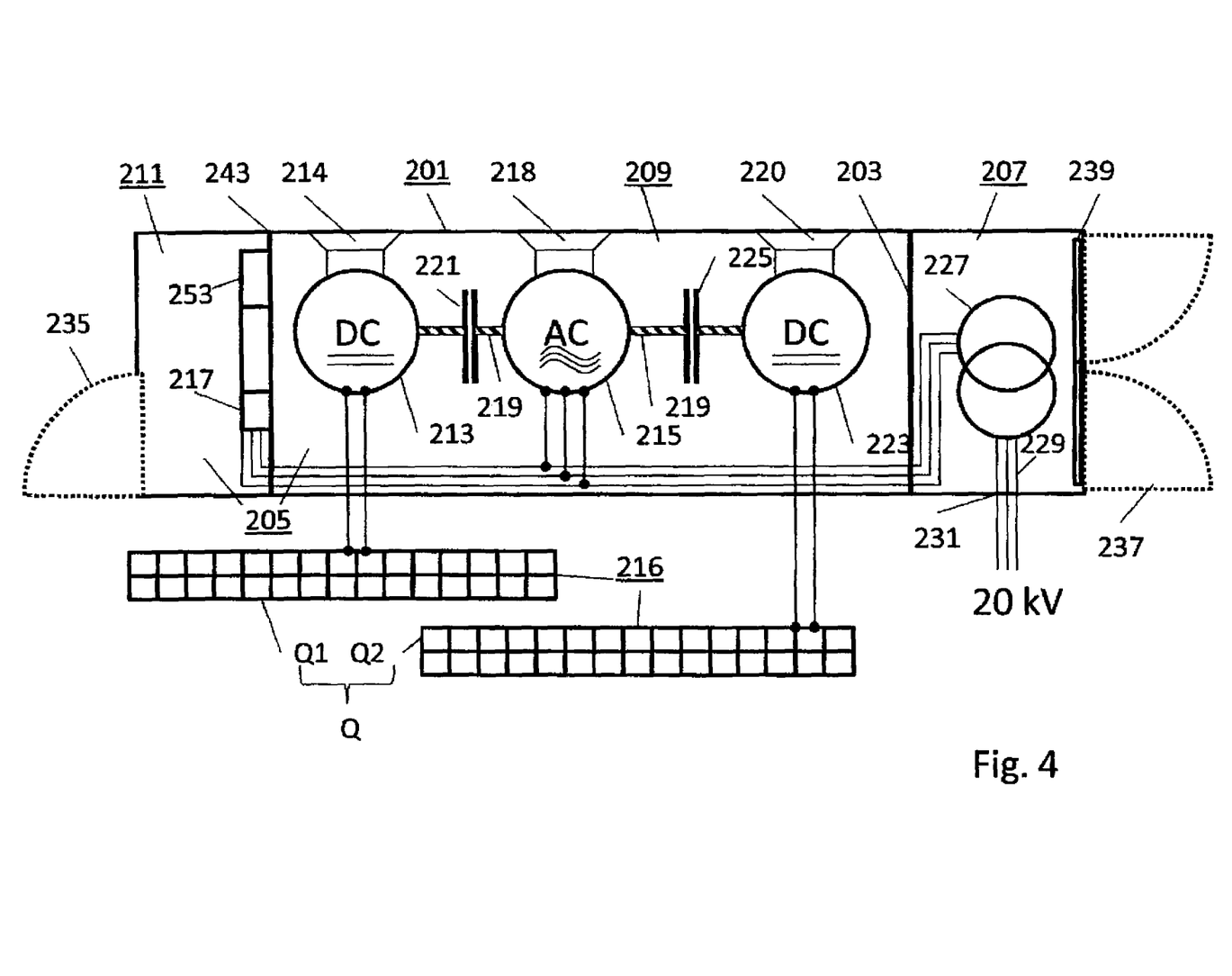

According to FIG. 4, all the aforedescribed components of a photovoltaic system can be fixedly installed in a cargo container 201, which can be transported, for example, overland.

Housing an electromechanical converter according to the invention in an oceangoing container 201 adapted for transport overland will now be described with reference to FIG. 4. It should be noted that components which are identical to those in FIGS. 1 to 3 are here labeled with different references symbols.

The following is a brief description: a first and a second DC motor 213, 223, which operate on a common shaft 219 of a three-phase generator 215, are installed in a machine room 209. The first and the second DC motor 213, 223 can be connected to/disconnected from the shaft 219 via a corresponding switchable coupling 221, 225. The first DC motor 213 can be operated with the generated power P1 from a first part of the photovoltaic modules 216 and the second DC motor 223 with the generated power P2 from a second part of the photovoltaic modules 216. A control unit 217 and externally introduced supply power cables (not indicated) to the DC motors 213, 223 are also provided, as well as fresh-air ducts 214, 218, 220 on the components 213, 215 and 223.

The container 201 is provided with a first partition wall 203 which divides the interior space of the container 201 into a first and a second interior space 205 and 207, respectively. The first partition wall 203 is here part of the requirements for medium voltage systems imposed by the country where the system is to be deployed. The first partition wall 203 can be formed of a continuous metal sheet or of a metal grid connected to a suitable ground (not shown). Medium voltage is defined as a voltage which is used by local utility companies to supply electric power to towns or parts of cities and is typically between 12 and 34 kV. The first interior space 205 has a second petition wall 243 which subdivides the first interior space 205 into a machine room 209 and a control room 211. The machine room 209 houses the externally excited DC motor 213 and the three-phase generator 215. The control room 211 also houses the associated control unit 217 which controls the machines 213, 223 and a connected electric photovoltaic system 216. The wiring disposed in the rooms 207, 209, 211 is not shown in detail. The wiring includes the typical connections, such as control lines to the first and second DC motor 213 and 223, and the three-phase generator 215, the supply lines for the control unit 217, the wires to the three-phase generator 215, etc.

The room 207 also houses a transformer 227 for connection to a power grid operating at a medium voltage of, for example, 20 kV.

The first DC motor 213 and the AC generator 215 are driven with the common one-part or multi-part shaft 219. The shaft 219 includes a first switchable coupling 221 arranged between the machines 213, 215 and adapted to disconnect the first DC motor 213 from the three-phase generator 215 in response to a corresponding control signal from the control unit 217, or to connect both machines 213, 215 with one another. The second externally excited DC motor 223, which also operates on the common shaft 219, is also installed in the machine room 209. The motor 223 can also be connected to and disconnected from the shaft 219 by way of a second switchable coupling 225.

The first DC motor 213 is operated with the generated power E1 from a first part Q1 of the photovoltaic modules 216, and the second DC motor 223 is operated with the generated power E2 from a second part Q2 of the photovoltaic modules 216. It is unimportant if a large assembly 216 of photovoltaic modules is subdivided into two parts Q1 and Q2 which may be oriented differently with respect to the sky, or if the large assembly 216 is composed of two systems Q1 and Q2 installed at different locations, which are connected to the common converter container 201. The control unit 217 and the power supply cable to the DC motors 213 and 223 are configured such that supply of the energy produced in the first part Q1 of the photovoltaic module 216 can be switched over, so that the energy supplied from the first part Q1 can be used in addition to the energy supplied from the second part Q2 of the photovoltaic system 216 for driving the second DC motor 223. It is hereby arbitrary which DC motor is considered the first DC motor 213 and which DC motor is considered the second DC motor 223. Alternatively, the energy produced by the second part Q2 may be supplied to the DC motor 213 associated with the first part Q1. This approach makes sense when the parts Q1 and Q2 of the photovoltaic modules or of the photovoltaic system are spaced apart several hundred meters or even kilometers. In this case, the following may be significant with varying cloud cover: when the energy produced by the photovoltaic system Q1 obscured by clouds is in itself insufficient to drive the associated DC motor efficiently, then this energy can be supplied to the other photovoltaic system Q2, which may at the same time be exposed to the sun.

As a result, the control unit 217 is designed for monitoring and controlling the first part Q1 as well as the second part Q2 of the photovoltaic system 216. The control unit 217 initiates disconnection of the switchable coupling 221 or 225 associated with the first part Q1 or the second part Q2, respectively, of the photovoltaic system 216 from the shaft 219 when the energy value falls below an available first minimum energy value and establishes a connection when the energy value exceeds an available second minimum energy value. In this way, at least one of the two DC motors 213, 223 can always be operated at an efficient operating point.

A transformer 227 is housed in the second interior space 207 of the container 201, which upconverts the voltage generated by the three-phase generator 215 from 400 V to a medium voltage of, for example, 20 kV. The 20 kV secondary side of the transformer 227 is connected to an electric utility grid via cables 229 which are routed through an opening 231 in the bottom of the container 201. Plug connections configured for connection of the control unit, the current supply to the DC motor, the transformer, and control devices, etc., may be mounted on the exterior wall of the container 201.

The container 201 is preferably a 40-foot standard cargo container, wherein the first interior space 205 at one end face is externally accessible through a first door 235 and the second interior space 207 is externally accessible through a second door 237. The second door 237 is a double-hinged door which extends across almost the entire end face of the container 201 and which has substantially across its entire surface openings behind which sound filtering elements 239 are arranged. The first door 235 is located on the other end face of the container 201. Access to the machine room 209 is provided through an (unillustrated) third door located in the second partition wall 243 which, as described above, divides the first interior space 205 into the machine room 209 and the control room 211. The aforementioned air outlet openings 214, 220 are provided above and on the side of the DC motors 213, 223. The air outlet opening 218 can also be provided on the three-phase generator 215.

What is claimed is:

1. A method for operating a photovoltaic system having a plurality of photovoltaic modules producing electric energy, comprising the steps of:
    connecting the photovoltaic modules to a first DC motor having a motor shaft,
    coupling a generator shaft of a three-phase generator to the motor shaft, wherein the three-phase generator is configured for connection to a power grid,
    coupling a motor shaft of a second DC motor to the generator shaft,
    when the electric energy produced by the plurality of photovoltaic modules is less than or equal to a predetermined power of the first electric motor, supplying the electric energy produced by the photovoltaic modules only to the first DC motor, and
    when the electric energy produced by the plurality of photovoltaic modules exceeds the predetermined power of the first electric motor, dividing the electric energy from the plurality of photovoltaic modules among both the first and the second DC motor.

2. The method of claim 1, wherein the predetermined power is between about 65% and about 80% of a nominal power rating of the first DC motor.

3. The method of claim 1, wherein the motor shaft of at least one of the first and the second DC motor is configured for coupling to the generator shaft of the three-phase generator via a coupling.

4. The method of claim 1, and further comprising the steps of:
    dividing the photovoltaic modules into a first subset and a second subset,
    supplying power from the first subset to a first output and supplying power from the second subset to a second output, wherein the first output is configured to be connected by a first switching element to an input of the first DC motor, and the second output is configured to be connected by a second switching element to an input of the second DC motor, and
    connecting the first output in parallel with the second output with a bridge switch and connecting the parallel connection of first and second output to the first DC motor and disconnecting the parallel connection from the second DC motor when only the first DC motor is supplied with the electric energy produced by the photovoltaic modules.

5. The method of claim 1, further disengaging the coupling between the motor shaft of the second DC motor and the generator shaft when only the first DC motor is supplied with the electric energy produced by the photovoltaic modules.

6. A photovoltaic system comprising:
    a plurality of photovoltaic modules divided into a first subset having a first output and a second subset having a second output and producing electric energy,
    a first DC and a second DC motor, each DC motor having a motor shaft,
    a first switch configured for electrically connecting the first output to the first DC motor to receive a DC voltage and a DC current from the first subset and a second switch configured for electrically connecting the second output to the second DC motor to receive a DC voltage and a DC current from the second subset, a bridge switch connecting the first output in parallel with the second output, a three-phase generator having a generator shaft and configured for connection to a power grid for supplying a generated AC voltage, and a coupling configured for coupling a corresponding motor shaft of the first and the second DC motor to the generator shaft of the three-phase generator, wherein the bridge switch is closed and one of the first and second switches is open when the electric energy produced by the combined first and second subset is less than or equal to a predetermined power of one of the first and second electric motor, and wherein the bridge switch is open and both first and second switches are closed when the electric energy produced by the plurality of photovoltaic modules exceeds the predetermined power of the one of the first and second electric motor, so as to divide the produced electric energy among both the first and the second DC motor.

7. The photovoltaic system of claim 6, wherein the first and the second subset have approximately identical size, and wherein the two DC motors are sized for identical nominal power.

8. The photovoltaic system of claim 7, wherein the two DC motors are sized for a nominal power between 1 MW and 3 MW.

9. The photovoltaic system of claim 6, further comprising a control unit configured to control the two DC motors, the three-phase generator, the coupling, the switching elements and the bridge switch.

10. The photovoltaic system of claim 9, wherein the control unit, the two DC motors, the three-phase generator, the switching elements and the bridge switch are fixedly installed in a cargo container.

* * * * *

UNITED STATES PATENT AND TRADEMARK OFFICE
CERTIFICATE OF CORRECTION

PATENT NO. : 8,247,923 B2  Page 1 of 1
APPLICATION NO. : 12/649536
DATED : August 21, 2012
INVENTOR(S) : Bernhard Beck

It is certified that error appears in the above-identified patent and that said Letters Patent is hereby corrected as shown below:

Title Page;

(30) Foreign Application Priority Data: Delete "Sept. 10, 2008 (DE) 10 2008 046 606".

(56) References cited, FOREIGN PATENT DOCUMENTS:
Delete "EP 102005000998" and replace with --DE 10 2005 000 998--.

Signed and Sealed this
First Day of January, 2013

David J. Kappos
*Director of the United States Patent and Trademark Office*